United States Patent [19]

Mares et al.

[11] 4,089,649
[45] May 16, 1978

[54] COMPOSITIONS AND PROCESS FOR FIBER MODIFICATION

[75] Inventors: Frank Mares, Whippany; Theodore Largman, Morristown, both of N.J.

[73] Assignee: Allied Chemical Corporation, Morris Township, N.J.

[21] Appl. No.: 663,871

[22] Filed: Mar. 4, 1976

[51] Int. Cl.² .................. D06M 13/20; D06M 13/40; D06M 13/42
[52] U.S. Cl. ...................................... 8/115.5; 8/115.6; 8/115.7; 8/120; 8/192; 8/DIG. 8; 8/DIG. 11; 8/DIG. 18; 260/77.5 MA; 260/77.5 AN; 260/77.5 A; 260/75 T; 260/75 N; 260/75 EP; 260/343; 260/346.3; 260/346.74; 260/830 P; 260/835; 260/836; 560/24; 560/76; 560/81; 560/90

[58] Field of Search .......... 8/115.5, DIG. 8, DIG. 11, 8/DIG. 18, 192, 120, 115.6, 115.7; 260/471 C, 475 R, 475 A, 475 P, 475 B, 836, 77.5 MA, 77.5 AN, 77.5 A, 830 P, 75 T, 75 N, 75 EP, 835, 343, 346.3, 346.8 R

[56] References Cited

U.S. PATENT DOCUMENTS

| 3,814,578 | 6/1974 | Pittman et al. | 8/127.6 |
| 3,969,394 | 7/1976 | Reader | 260/471 C |

*Primary Examiner*—John Kight, III
*Attorney, Agent, or Firm*—Robert A. Harman

[57] ABSTRACT

Hydrophilic additives are provided which may be introduced into fibrous articles to provide improved water absorbency and charge dissipation properties which resist abrasion and laundering. The fibrous articles are treated by contacting the articles with at least one hydrophilic additive, polyfunctional reactant and nitrogen catalyst under conditions sufficient to incorporate hydrophilic additive, polyfunctional reactant and nitrogen catalyst in the articles, followed by heating the fibrous articles to obtain the desired fiber characteristics.

17 Claims, No Drawings

COMPOSITIONS AND PROCESS FOR FIBER MODIFICATION

BACKGROUND OF THE INVENTION

1. Field of the Invention

This invention relates to process and composition for the treatment of fibers or articles fabricated therefrom, and more particularly to process and composition for imparting wettability to artificial fibers, and more specifically to polyethylene terephthalate fibers.

2. Description of the Prior Art

In the past, synthetic fibers have found widespread acceptance in industry and consumer use due to the strength, toughness and higher modulus of these fibers and the goods made therefrom. However, in spite of the positive features, there are also certain properties of synthetic fibers which are objectionable to the consumer. Among these, the fibers are generally hydrophobic and therefore unable to absorb and transport moisture and to dissipate static charge. They also exhibit a propensity to accept and to hold soil deposits. In addition, polyethylene terephthalate fibers, in particular, are difficult to dye with dispersed and water based dyes.

Prior practitioners have attempted to eliminate the negative aspects of synthetic fibers by approximation of natural fibers in their ability to interact with water. In the literature, there are several approaches to this problem: First, hydrophilic polymers are formed by polymerization of new monomers with pendant hydrophilic groups or by copolymerization of the existing monomers with new hydrophilic monomers. Secondly, hydrolysis of the surface of the fiber has been performed in order to form —OH groups on the surface. Also, grafting of hydrophilic units of the fiber surface has been attempted. Finally, polymeric, hydrophilic, water-insoluble finishes have been applied to finished goods made from the synthetic fiber.

The first approach is in fact a rejection of the existing fibers and requires preparation of a completely new fiber, which will result in considerable expense connected with the introduction of a new generic fiber on the market. The second approach, namely that of hydrolysis of the polymer surface, is a very delicate operation and may lead to a lower molecular weight species at the fiber surface, decreasing the stability of these species on washing. Deeper hydrolysis may result in partial degradation of the polymer and therefore further decrease the fiber strength.

Grafting of hydrophilic species such as acrylic acid on the fiber surface is a radical reaction usually initiated by gamma radiation or other high energy sources. The main disadvantage is a lower efficiency of radical formation on the polymer backbone and easy polymerization of acryclic acid into polyacrylic acid without any chemical bonding to the fiber surface.

Finally, the application of polymeric textile finishes normally leads to modifications of low durability on abrasion and usually creates a barrier to subsequent dyeing of the treated fabric. The application of a polymeric textile finish is therefore usually the last operation in manufacture of the final goods. Since the finishes are generally soft plastic polymers, they may serve as soil traps.

SUMMARY OF THE INVENTION

In accordance with the present invention, there are provided hydrophilic additives for imparting wettability and charge dissipation properties to a wide variety of fibers and articles fabricated therefrom. As used herein, the term "fibrous article" is intended to refer to monofilament fibers, fiber bundles and articles fabricated therefrom (e.g., textile fabrics), woven and non-woven. These fiber additives may provide improved wettability, charge dissipation or both to a fibrous article, with various degrees of laundry stability and abrasion resistance, allowing the production of fibrous articles having a wide range of surface properties.

The desired water absorbency can be achieved by: (a) contacting the fibrous article in liquid medium with (1) at least one hydrophilic additive of the present invention, (2) at least one polyfunctional reactant having at least two groups per molecule selected from the group consisting of epoxide and isocyanate groups, and (3) a suitable nitrogen catalyst under conditions sufficient to incorporate additive, reactant and catalyst in the fibrous article; and (b) heating the treated fibrous article.

It has been found by obervation of fiber surfaces using scanning electron microscopy that, by the process of the present invention, hydrophilic additives are incorporated into the fiber surface and become an integral part of the fiber, in contrast to the non-compatible polymeric hydrophilic chemicals of the prior art. The selected hydrophilic compound, polyfunctional reactant and nitrogen catalyst are incorporated into the fiber matrix for reaction of the hydrophilic additive and polyfunctional reactant near the fiber surface to form oligomeric particles which are entangled in the fiber matrix of the original polymer. Thus, a fiber is produced which tends to retain its wettability and charge dissipation properties longer than fibers provided with polymeric hydrophilic coatings of the prior art since the hydrophilic surfaces formed by the present invention resist being abraded away with wear or laundering.

In addition, it has been surprisingly discovered that the hydrophilic surfaces produced in accordance with the process of the present invention do not prevent dye penetration and, hence, the treated fibrous articles may be subsequently dyed. Moreover, it has been observed that the additives of the present invention do not appreciably transfer from the treated fibrous article to an untreated fabric or fiber, thereby enabling laundering or further processing of the treated fibrous articles together with untreated fabric or fibers without substantial transfer of the hydrophilic additives.

Thus, the additives of the present invention may be incorporated into a fiber, yielding a modified fiber from which a desired fabricated article (e.g., wearing apparel) may be made by use of standard fiber processing steps, such as crimping, twisting, knitting, weaving, etc. without destroying the modified surface properties of the fiber.

DETAILED DESCRIPTION OF THE INVENTION

The hydrophilic additives employed as fiber additives in the present invention are selected from the group consisting of (1) compounds containing at least two ether linkages and at least one —OH group per molecule, (2) compounds containing at least one carbamyl diradical (—NHCO—) and at least one —OH group per molecule, and (3) compounds containing at least two

moieties and at least one additional —OH group per molecule. Preferred are compounds falling within the above group which contain at least two —OH groups per molecule. Hydrophilic additives suitable in the practice of this invention include members of the group consisting of compounds having the formula:

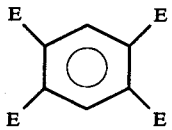 (A)

wherein two E groups are $E_1$, and two E groups are $E_2$, wherein (i) $E_1$ is —$CON(R_1)_2$ or —$CO_2R_1$, wherein $R_1$ is a monovalent radical of the formula

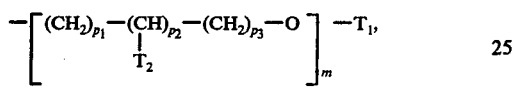

wherein m is an integer of from 0 to 10; $p_1$, $p_2$ and $p_3$ are each integers of 0 or 1; $T_2$ is selected from the group consisting of hydrogen, —OH, $T_1$ and $OT_1$; and $T_1$ is in each occurrence independently selected from the group consisting of radicals of the formula

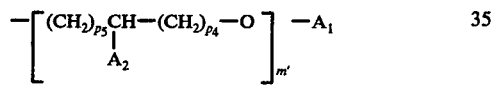

wherein $m'$ is an integer of 0 to 10; $p_4$ and $p_5$ are each integers of from 0 to 1, $A_1$ is alkyl of 1 to 3 carbon atoms, and $A_2$ is selected from the group consisting of radicals of the formula —X and —OX, wherein X is a member of the group consisting of hydrogen and alkyl of 1 to 3 carbon atoms; and (ii) $E_2$ is —$CO_2H$ or —$CO_2(CH_2)_{x_1}$(-CHOH)$_{x_2}CH_2Q$, in which $x_1$ and $x_2$ are each integers of 0 or 1, and Q is hydrogen or —OH; with the provisos that (1) the sum of $p_1$, $p_2$ and $p_3$ must be at least two; (2) the sum of $p_4$ and $p_5$ must be at least one; (3) $\Sigma m$ must be at least 2; (4) when Q is —OH, $x_1$ must be 1, and (5) at least one E group must contain at least one —OH group;

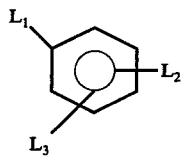 (B)

$L_1$, $L_2$ and $L_3$ are independently selected from the group consisting of —$CO_2H$, —$CON(R_1)_2$, —$CO_2(CH_2)_{x_1}$(-CHOH)$_{x_2}CH_2Q$ and —$CO_2R_1$, wherein $x_1$, $x_2$, Q and $R_1$ are as defined above, with the provisos that (1) at least one of $L_1$, $L_2$ and $L_3$ must contain at least one —OH group; (2) at least one of $L_1$, $L_2$ and $L_3$ must be —$CO_2R_1$; (3) the sum of $p_1$, $p_2$ and $p_3$ must be at least two; (4) the sum of $p_4$ and $p_5$ must be at least one; (5) $\Sigma m$ must be at least 2; and (6) when Q is —OH, $x_1$ and $x_2$ must each be 1;

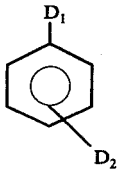 (C)

$D_1$ and $D_2$ are the same or different and are independently selected from the group consisting of —$O_2CR_2$ and

wherein $R_2$ is a monovalent radical having the formula

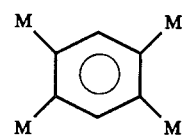

wherein $p_6$ is an integer of 2 to 4;

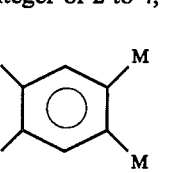 (D)

wherein two M groups are $M_1$ and two M groups are $M_2$, wherein $M_1$ and $M_2$ are monovalent radicals independently selected from the group consisting of —$O_2CR_2$ and

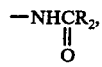

wherein $R_2$ is as defined above;

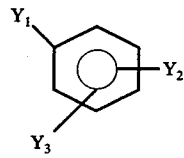 (E)

wherein $Y_1$, $Y_2$ and $Y_3$ are independently selected from the group consisting of —$O_2CR_2$ and

wherein $R_2$ is as defined above; and mixtures thereof.

The term "alkyl" employed in the definition of the monovalent radicals $A_1$ and $A_2$ is meant to include branched and straight-chained radicals.

The term "$\Sigma m$" employed herein is intended to mean the sum of the integers comprising m and $m'$ in each occurrence of these integer variables in the defined $R_1$ radical, per molecule of hydrophilic additive.

A preferred range for $m$ is from 0 to 7, and a preferred range for $m'$ is from 0 to 4. Preferably, $T_2$ is selected from the group consisting of hydrogen, —OH and —OT$_1$, with $m$ and $m'$ being defined by their respective preferred ranges.

Within Class A, $E_1$ and $E_2$ are preferably the same or different and are —CO$_2$R$_1$ in which R$_1$ is as defined above.

Preferred Class B additives are those in which L$_1$, L$_2$ and L$_3$ are the same or different and are —CO$_2$R$_1$. Preferred Class C, D and E additives are those in which D$_1$, D$_2$, M$_1$, M$_2$, Y$_1$, Y$_2$ and Y$_3$ in the respective Classes are the same or different and are —CO$_2$CR$_2$, in which R$_2$ is as defined above.

The hydrophilic additives of Class A may comprise one isomer of the Class A formula, e.g. the "para-isomer" in which the $E_1$ groups are in a para position with respect to each other, and thus in which the $E_2$ groups are in the para position with respect to each other, or the "meta-isomer" in which the $E_1$ groups are in a meta position with respect to each other, and thus in which the $E_2$ groups are in a meta position with respect to each other. Mixtures of the isomeric Class A additives, e.g. mixtures of the meta- and para-isomers of Class A, may also be employed. Preferably, approximately 50:50 molar mixtures of the para- and meta-isomers of Class A additives are employed in accordance with the process of the present invention.

The isomers of Class D are similarly defined, e.g. the para-isomers of Class D correspond to additives of that Class wherein the M$_1$ groups are in a para position with respect to each other, and thus in which the M$_2$ groups are in a para position with respect to each other. Like the additives of Class A, the additives of Class D may comprise isomer mixtures. Preferred Class D isomeric additives mixtures are approximately 50:50 molar mixtures of the para-and meta-isomers.

Preferred as the hydrophilic additives of Class B are approximately 50:50 molar mixtures of para-CO$_2$R$_1$ Class B additives (in which L$_1$ and L$_2$ are each —CO$_2$R$_1$ and are in a para-position with respect to each other), and the meta-CO$_2$R$_1$ Class B additives (in which L$_1$ and L$_2$ are —CO$_2$R$_1$ and are in a meta-position with respect to each other).

Examples of hydrophilic additives falling within the above classes are as follows:

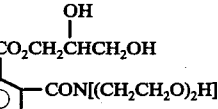

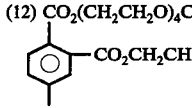

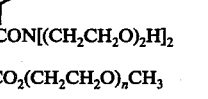

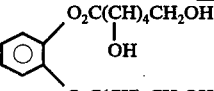

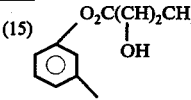

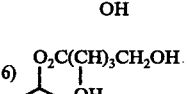

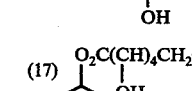

Class C

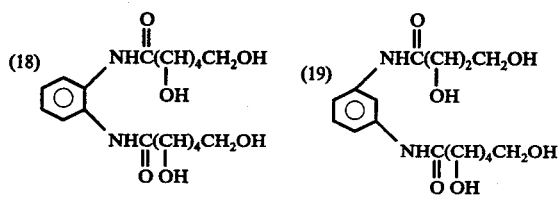

Class D

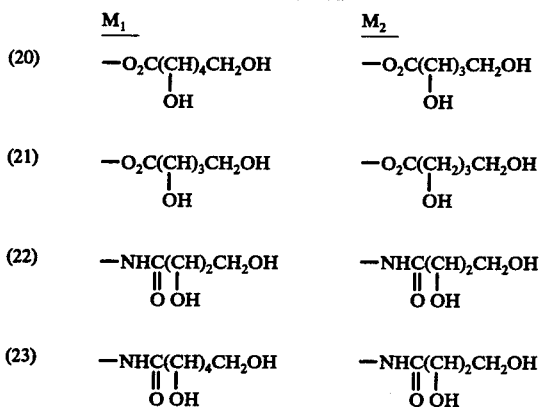

Class E

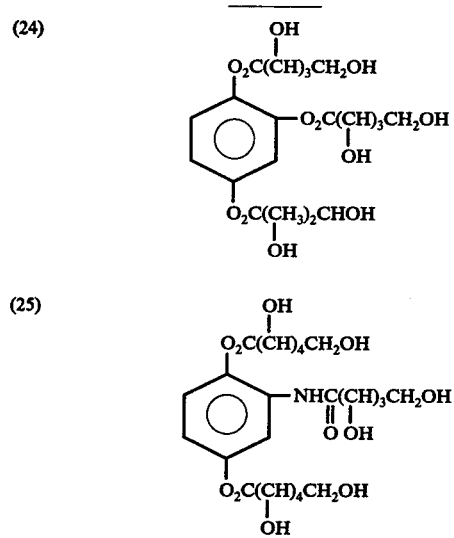

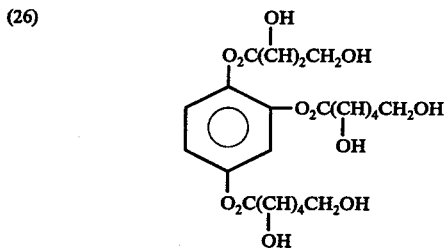

Class E

(27) 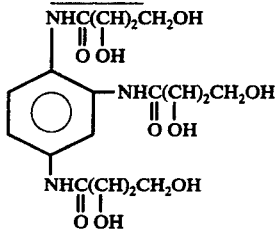

In addition to having the foregoing chemical structure, the hydrophilic additive must also possess certain physical properties. The additives must be substantially thermally stable at the temperature used in the heat treatment step which will generally range from 90° to 230° C. An additive is thermally stable if it survives the heat treatment process without forming undesirable heat decomposition products and without decomposing to such an extent as to lose an appreciable amount of the effectiveness in imparting wettability and anti-static properties to the filament. In addition to being thermally stable, the additive must be also non-fugitive, i.e., not appreciably volatile, at the selected heat treatment temperature, otherwise it would escape from the filament. To be suitable, the additive must have a strong ability for hydrogen bonding, as indicated by possessing solubility in polar solvents such as water, methanol or ether solvents (e.g. dioxane).

The polyfunctional reactants which may be employed in the practice of the present invention are compounds having per molecule at least two radicals selected from the group consisting of epoxide and isocyanate radicals, and mixtures of such compounds. Thus, there may be employed as the polyfunctional reactant such compounds as difunctional or trifunctional epoxides, difunctional or trifunctional isocyanates, reactants having at least one epoxide group and at least one isocyanate group per molecule, and mixtures of such compounds. Thus, suitable polyfunctional epoxides are those containing two or more epoxide groups per molecule. Likewise, suitable polyfunctional isocyanates are those containing two or more isocyanate groups per molecule. Such polyfunctional isocyanates and epoxides are conventional and may be prepared by known methods.

Exemplary of suitable polyfunctional epoxides are members selected from the group consisting of

wherein G' is selected from the group consisting of

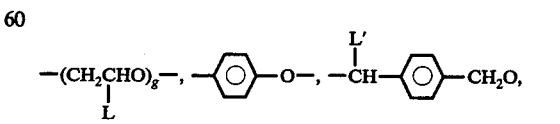

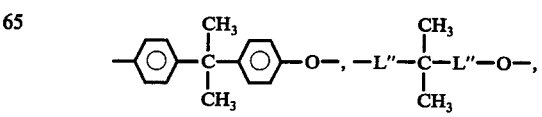

-continued and CH$_2$CH(CH$_2$)$_g'$—O—,
      |
      L' wherein $g$ is an integer of 1 to 10, $g'$ is an integer of 1 to 4, L is a member selected from the group consisting of hydrogen, alkyl radicals of 1 to 5 carbon atoms, aryl radical, —CH$_2$OH, —CH$_2$Cl or

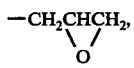

L' is a member selected from the group consisting of hydrogen, alkyl radicals of 1 to 5 carbon atoms, —CH$_2$CH(OH)CH$_2$OH and

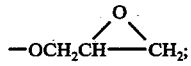

and L'' is saturated cycloalkyl radical of 5 or 6 carbon atoms;

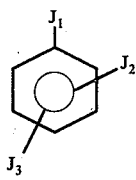
(ii)

wherein G'' is —OH, —OCH$_2$CH(OH)CH$_2$OH or

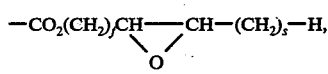

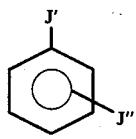
(iii)

wherein J$_1$, J$_2$ and J$_3$ are independently selected from the group consisting of —CO$_2$R$_1$ and —CO$_2$(CH$_2$)$_f$CH——CH—(CH$_2$)$_s$—H,
              \\O/ wherein $f$ is an integer of 1 to 6, $s$ is an integer of 0 to 3, and R$_1$ is as defined previously for the hydrophilic additives of Class A, with the proviso that at least two of J$_1$, J$_2$ and J$_3$ contain an epoxide group; and

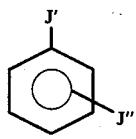
(iv)

wherein J' and J'' are the same or different and are monovalent radicals of the formula —CO$_2$(CH$_2$)$_f$CH——CH$_2$—(CH$_2$)$_s$—H,
              \\O/ wherein $f$ and $s$ are as defined above.

Preferred polyfunctional epoxides falling within the above group are

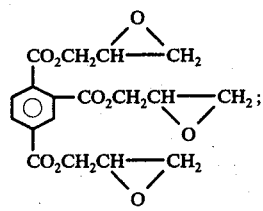
(1)

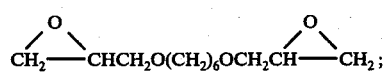
(2)

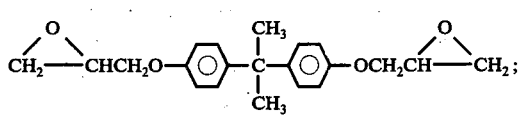
(3)

Dow Epoxy (4)

Resin DER 732; and (5) Dow Epoxy Resin DER 736. (DER 732 and 736 are polyether diepoxides manufactured by Dow Chemical, and have equivalent molecular weights of 305-335 and 175-205, respectively).

Exemplary of suitable polyfunctional isocyanate compounds are those selected from the group consisting of (1) difunctional isocyanates having the formula T$_3$(NCO)$_2$ in which T$_3$ is a diradical selected from the group consisting of alkyl of 2 to 8 carbon atoms, aryl of 6 to 10 carbon atoms, alkyl-substituted aryl of 7 to 14 carbon atoms, cycloalkyl of 3 to 8 carbon atoms, radicals of the formula —T$_4$'OT$_4$'— and radicals of the formula formula

—T$_4$'NT$_4$'—,
     |
     R'' wherein T$_4$' is divalent alkyl of 2 to 8 carbon atoms or divalent aryl and R'' is monovalent alkyl of 1 to 3 carbon atoms; (2) trifunctional isocyanates having the formula T$_4$(NCO)$_3$, wherein T$_4$ is a triradical selected from the group consisting of alkyl of 3 to 8 carbon atoms, aryl of 6 to 10 carbon atoms, alkyl-substituted aryl of 7 to 14 carbon atoms, cycloalkyl of 3 to 8 carbon atoms, and radicals of the formula

—T$_4$'NT$_4$'—,
     |
     T$_4$'— wherein T$_4$' is as defined above, and mixtures thereof. Examples of such polyfunctional isocyanates are: toluene-2,4-diisocyanate, OCNCH$_2$CH$_2$CH$_2$NCO, OCNCH$_2$CH$_2$O(CH$_2$CH$_2$O)$_4$CH$_2$CH$_2$NCO and

OCNCH$_2$CH$_2$NCH$_2$CH$_2$NCO.
           |
           CH$_2$CH$_2$NCO

Suitable nitrogen catalysts which may be used include (1) tertiary amines, (2) amino acids (e.g. ε- aminocaproic acid, glycine, lysine, etc.), (3) caprolactam, and (4) mixtures thereof. Suitable tertiary amines include amines wherein the N-H hydrogens are substituted by a member selected from the group consisting of alkyl radicals of 1 to 5 atoms, aryl radical, alkyl-substituted aryl radicals having a total of from 7 to 10 carbon atoms, aryl-substituted alkyl radicals having a total of 7 to 10 carbon atoms, and mixtures thereof, and heterocyclic amines having from 5 to 9 ring carbon atoms. Examples of these tertiary amines are butyldimethylamine, trimethylamine, tributylamine, tripentylamine, dimethyl-sec-butylamine, benzyldiphenylamine, benzylethylphenylamine, benzylethyl 2-tolylamine, tribenzylamine and pyridines and piperidines wherein the N-H hydrogen is substituted by alkyl having from 1 to 5 carbon atoms or aryl. However, when the selected polyfunctional reactant contains one or more isocyanate (—N=C=O) groups, only tertiary amines may be used as catalyst, since amino acids react with isocyanate groups to form undesired by-products, and since amino acids and caprolactam do not catalyze the desired reaction between the isocyanate-containing polyfunctional reactant and hydrophilic additive.

FIBER PREPARATION

In accordance with the process of the present invention, a fibrous article is contacted with the selected hydrophilic additive, polyfunctional reactant and nitrogen catalyst, followed by heating the treated fibrous article to achieve the desired fiber properties.

It is preferred that the article be contacted for absorption of hydrophilic additive, polyfunctional reactant and nitrogen catalyst therein. However, this is not required, and the additive, reactant and catalyst may be adsorbed on the surface of the fibrous article since it has been found that both adsorbed and absorbed additive and reactant will, during the subsequent heating step, penetrate the article and react therein to provide the desired hydrophilic fibrous article. As used herein, therefore, the terms "incorporated into" and "incorporate in" (as applied to the presence of additive, reactant and catalyst on or in a fibrous article) are intended to include both adsorption and absorption of additive, reactant and catalyst.

The selected hydrophilic additive, polyfunctional reactant and nitrogen catalyst may be employed in an organic or a substantially neutral-pH aqueous medium (e.g., a pH of from 5 to 8) in a wide variety of concentrations. Generally, however, the hydrophilic additive and polyfunctional reactant are employed in the selected liquid medium in an additive:reactant molar ratio of from about 2:1 to about 1:3, preferably from about 1.5:1 to 1:1.5, and nitrogen catalyst is generally used in an amount of from about 0.1 to 5 mole percent, based on the total number of moles of additive and polyfunctional reactant in the liquid medium. The amount of additive incorporated into the liquid medium for contact of the fibrous article will of course, vary widely depending upon the additive selected, the fiber to be treated, the fiber properties desired, and other factors. Generally, however, the additive is incorporated into the liquid medium in an amount of from about 0.1 to 5% by weight, and most preferably from about 0.5 to 2% by weight.

Incorporation of the selected additive, reactant and catalyst into the fibrous article may be achieved by several methods. Thus, the article may be contacted with (1) an aqueous solution of the additive containing the polyfunctional reactant and nitrogen catalyst, or (2) an organic solvent containing the reactant and catalyst and having the additive dissolved therein. The temperature of the liquid medium used to treat the article and the time for which the article is contacted with the liquid medium is also not critical. Generally, however, the temperature will vary from about 10° to 60° C, and preferably from about 15° to 40° C., and the time from about 1 second to 1 hour, and preferably from about 5 seconds to 10 minutes. However, higher and lower temperatures and shorter and longer contact times may be employed with advantageous results.

The amount of hydrophilic additive to be incorporated into the fibrous article by the present invention is not critical and will vary widely depending upon the additive selected, the surface properties sought, the fiber treated, and other factors. Generally, however, the hydrophilic ether additive is incorporated into a fibrous article in an amount of up to about 5 percent by weight, preferably from about 0.5 to 3 percent by weight, and most preferably from about 1 to 2 percent by weight of the article. Thus, the quantity of hydrophilic additive that is contained in the liquid medium will generally be sufficient to provide a fibrous article having the additive incorporated therein in the above amounts, e.g. up to about 5 percent by weight of the fibrous article.

When it is desired to employ an organic solution of the hydrophilic additive, the organic solvent selected will, of course, depend upon the solubilities of the additive in the solvent. Suitable organic solvents may be easily determined by routine experimentation and include ethers (e.g., dioxane); ketones (e.g., acetone); alcohols (e.g., isopropanol); chlorinated hydrocarbons (e.g., chloroform); and aromatic and substituted aromatic hydrocarbons (e.g., benzene, toluene and chlorinated benzenes). It is preferred, however, that the organic solvent selected for use not also be a solvent for the fibrous article which is being treated to prevent substantial degradation of the fiber when the additive solution is brought into contact therewith.

The fibrous article may be contacted with a liquid medium containing the selected hydrophilic additive, polyfunctional reactant and nitrogen catalyst by any standard method employed in the industry to contact a liquid and fiber filaments or articles fabricated therefrom. In the preferred practice, the fiber is first formed into a fabricated article such as an article of clothing which is then contacted with the liquid medium containing the selected additive.

It will be appreciated that the hydrophilic additives of the present invention may be applied to a fibrous article by spraying the additive thereon, as from an aerosol formulation comprising (1) a liquid medium containing the additive and (2) a suitable aerosol propellant. The precise aerosol formulation selected is, of course, in no way critical to the present invention, and the liquid medium may also contain such surface active agents as are necessary to disperse or dissolve the selected additive in the liquid medium which is employed in the event the additive is not soluble therein.

It will also be appreciated that the fibrous article may be contacted with the liquid medium containing the hydrophilic additive either before, during or after the article is contacted with a liquid medium containing the polyfunctional reactant and/or nitrogen catalyst. Thus, for example, sequential dipping of a fibrous article into separate liquid media containing the additive, polyfunctional reactant or nitrogen catalyst may be employed.

However, to prevent a subsequent dipping step from solubilizing and washing away additive or catalyst applied in a previous step, sequential dipping is preferably employed only with additive polyfunctional reactant catalyst systems that have different solubilities using solvents that will not solubilize an ingredient previously applied. For example, as amino acids are soluble in water but insoluble in dioxane, a fibrous article may be treated by sequentially dipping the article into an aqueous solution containing the selected amino acid catalyst, and then, preferably after air drying, into a dioxane solution containing the selected hydrophilic additive and polyfunctional reactant. When sequentially contacted with liquid media containing additive, reactant and catalyst, the fibrous article is preferably air dried between dipping steps.

When a polyfunctional isocyanate is employed as polyfunctional reactant, the reactant is preferably applied to the fibrous article with an organic solvent for the reactant. When it is desired to employ water as the liquid medium, it is necessary to first treat the polyfunctional isocyanate to prevent its reaction with water which would render the reactant largely ineffective. Procedures for treating the reactant to protect the isocyanate groups are known and their description is not critical to the present invention. For example, the isocyanate reactant may be contacted with sodium bisulfite to form an isocyanate adduct which will not react with the aqueous media and which will release the isocyanate groups on heating of the fibrous article into which the adduct has been incorporated, with concurrent evolution of sulfur dioxide gas and formation of sodium sulfite. Similarly, the polyfunctional isocyanate may be treated to protect the isocyanate group by reacting the isocyanate reactant with phenol to form an isocyanate adduct which regenerates phenol and the isocyanate on heating. As the latter isocyanate adduct generally is not soluble in water, an aqueous emulsion of the adduct may be formed using conventional emulsifying agents. After reaction of the isocyanate to protect the isocyanate group, the fibrous article is contacted with an aqueous medium containing the adduct to incorporate it into the fibrous article. The residues of sodium sulfite may be removed from the treated fibrous article by water washing subsequent to the heat treatment, whereas the phenol residues may be removed by conventional evaporation processes. The article should then be allowed to dry and substantially all water should be removed therefrom so as to prevent reactant with the isocyanate groups regenerated in the subsequent heat treatment step. The temperatures required to regenerate the isocyanate group will vary widely, but will generally range from about 90° to 230° C.

Both aqueous and organic liquid mediums may also contain a dye to enable concurrent dyeing and additive absorption. The dye selected is not critical and dyes such as dispersed dyes (e.g. Resolin Blue BFLB and Nacelan Blue FFRN (C.I. Disperse Blue Three) have been found quite satisfactory. The quantity of dye employed is not critical, and may be used in the amounts conventionally employed to obtain the desired shade.

Following treatment of the fibrous article with the selected liquid medium, the article is subjected to a heat treatment preferably after being air dried, in order to achieve the desired hydrophilic properties. While air drying of the fibrous article is not generally required, when the article is treated with an aqueous medium containing the additive/reactant or catalyst and a polyfunctional epoxide is employed as polyfunctional reactant, the article is preferably air dried prior to annealing to prevent premature inactivation of the epoxide compound by reaction with water on the fiber.

The fibrous article contacted with the selected hydrophilic additive, polyfunctional reactant and nitrogen catalyst may be heat treated as by annealing the fibrous article (e.g., in a circulating or static air oven) under conditions sufficient to effect reaction of the polyfunctional reactant and hydrophilic additive in the fibrous article. The temperature of heat treatment may vary widely but is generally from about 90° to 230° C., and preferably from about 120° to 150° C. The time of such heat treatment is not critical, but is generally from about 5 seconds to 240 minutes. Likewise, the pressure in which the annealing heat treatment is performed is not critical and atmospheric pressure has been found to be quite satisfactory.

The present invention advantageously improves the water absorption and/or charge dissipation properties of filaments prepared from any fiber-forming thermoplastic resin, such as polyamide, polyester, polyacrylonitrile and blends thereof. Particularly good results are obtained with polyester fibers and articles fabricated therefrom, especially with fibrous articles containing polyethylene terephthalate and/or polybutylene terephthalate. When polyester fibers and fabricated articles are treated, especially preferred results are obtained using the hydrocarbon ether/hydroxy additives of Class A.

The hydrophilic additive and polyfunctional reactant may be incorporated into the fiber and the fiber heat treated before or after the application of a spin finish to the fiber and before or after crimping or texturizing of the fiber. Spin finishes which may be employed are conventional and should be selected to prevent inclusion of a component of the spin finish which substantially reacts with either the fiber, hydrophilic additive, polyfunctional reactant or nitrogen catalyst. The spin finish may be employed in any amount conventionally used to produce the intended processing characteristics of the extruded fiber. The selected hydrophilic additive, polyfunctional reactant and amine catalyst may also be incorporated into a fiber from which the spin finish has been removed, as by employing a conventional scouring process (e.g., washing with a soap solution). However, unscoured fiber may also be treated in accordance with the process of the present invention.

SYNTHESIS OF HYDROPHILIC ADDITIVES

The hydrophilic additives of the present invention may be prepared by conventional methods.

Thus, an alcohol of the formula $R_1OH$, wherein $R_1$ is as defined above for the additive of Class A, may be reacted with pyromellitic anhydride to yield a Class A additive wherein $E_1$ is $-CO_2R_2$ and $E_2$ is $-CO_2H$. This compound may be then reacted with the suitable epoxide, e.g.

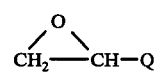

wherein Q is as defined above, to obtain a Class A additive wherein $E_2$ is $-CO_2(CH_2)_{x_1}(CHOH)_{x_2}CH_2Q$, wherein $x_1$, $x_2$ and Q are as defined above. The Class A additives wherein $E_1$ is $-CON(R_1)_2$ may be similarly obtained, substituting the appropriate amine for the $R_1OH$ alcohol.

Similarly, an $R_1OH$ alcohol may be reacted with trimellitic anhydride to provide a Class B additive wherein $L_1$ and $L_2$ are $-CO_2H$ and $L_3$ is $-CO_2R_1$. This additive may then be reacted with a suitable epoxide, e.g.

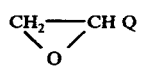

to produce a Class B additive wherein $L_1$ and $L_2$ are $-CO_2(CH_2)_{x_1}(CHOH)_{x_2}CH_2Q$, wherein $x_1$, $x_2$ and Q are as defined above. Trimellitic chloride anhydride may be reacted with an $R_1OH$ alcohol to provide the Class B additives wherein $L_1$ is $-CO_2H$ and $L_2$ and $L_3$ are $-CO_2R_1$.

The hydrophilic additives of Class C may be prepared by reaction of phenylene diamine, or dihydroxybenzene, with the corresponding lactone, e.g. gluconic acid lactone. Similarly, the additives of Class D may be prepared by reaction of tetramino benzene or tetrahydroxy benzene with the desired lactone, and the additives of Class E may be prepared by reaction of a lactone with the desired tetramino benzene or trihydroxy benzene.

The process of the present invention may be further illustrated by reference to the following examples. In the examples below, the term "laundry cycle" is intended to refer to one washing in an automatic washer (Sears, Kenmore) in hot water (about 140° F.) using one cup of Tide detergent at a constant load of 3 pounds. The samples were dried for 30 minutes in an automatic dryer (Sears, Kenmore) at a temperature of about 140°–160° F. Static charge dissipation in the following examples was measured either by use of a voltameter manufactured by Rotchield (Zurich, Switzerland) or by the AATCC cling test, as established by the American Association of Textile Colorists and Chemists.

The ability of a treated fabric to wick with water was determined as follows: a strip of the cloth to be tested 1 inch wide and 10 inches long was marked 1 inch from the bottom by a horizontal line using a lead pencil. From the 1 inch horizontal mark to the top of the strip three parallel vertical lines were made by a marking pen containing ink soluble in water. A weight was placed at the bottom of the cloth strip, and the strip was hung over a dish to which distilled water was then added until the water level reached the 1 inch horizontal mark on the strip. The height of the wicked water level on the strip was then read at the selected time increments, with zero time defined as the moment when water reached the 1 inch horizontal mark.

The wettability of a tested cloth was determined by placing the tested cloth on top of a small glass dish, and placing a drop of water on the cloth using a standard eye dropper (having a diameter of about ⅛ inch). The time required for the drop to spread and be completely absorbed by the cloth is recorded.

EXAMPLES 1-23

In the following Examples, a 10 in. × 15 in. sample single knit cloth, manufactured from polyethylene terephthalate fiber, was thoroughly immersed in the selected liquid medium containing the indicated hydrophilic additive, polyfunctional reactant and nitrogen catalyst. The samples were then hand wrung in order to remove excess liquid and air dried. The air dried samples were then annealed in a circulating air oven for the indicated time at the selected temperature.

The liquid medium contained hydrophilic additive and polyfunctional reactant in an amount sufficient to provide a total additive/reactant concentration on the air-dried cloth sample of about 1 percent by weight of the cloth. The nitrogen catalyst was employed in a dioxane solution in a catalyst-to-polyfunctional reactant mole ratio of about 0.05 to 1. In the instance in which an amino acid was selected as the nitrogen catalyst, the article was first contacted with an aqueous solution of the amino acid, air dried and then contacted with a dioxane solution containing the hydrophilic additive and polyfunctional reactant.

The annealed cloth in each example was tested to determine charge dissipation, wettability and wicking. The data thereby obtained are set forth in Table I. Attention is drawn to the improved cloth properties as compared to the untreated control sample which was merely immersed in dioxame, hand-wrung, air-dried and annealed at the indicated temperature for 15 minutes.

TABLE I

| Example No. | Components Hydrophilic Compound | Polyfunctional Reactant | Nitrogen Catalyst | Annealing Conditions Temp. (° C) | Time (Min.) | Charge Dissipation (Sec.) | Wettability (Sec.) | Wicking (Inch) |
|---|---|---|---|---|---|---|---|---|
| Control | — | — | — | 160 | 15 | >1800 | >360 | 1.2 |
| 1 | (a) | (1) | TBA | 160 | 5 | >1800 | >360 | 2.5 |
| 2 | " | " | " | 160 | 5 | >1800 | >360 | negligible |
| 3 | " | " | " | 160 | 5 | >1800 | >360 | 1.8 |
| 4 | " | (2) | " | 160 | 10 | 810 | 7 | 3.0 |
| 5 | " | (3) | " | 160 | 10 | >1800 | — | 4.4 |
| 6 | " | (4) | " | 160 | 10 | >1800 | 1 | 2.4 |
| 7 | " | — | " | 160 | 10 | >1800 | 1 | 1.8 |
| 8 | — | (4) | " | 160 | 10 | >1800 | 45 | 2.8 |
| 9 | (b) | (1) | " | 160 | 10 | 260 | >300 | negligible |
| 10 | " | " | " | 160 | 10 | 470 | 60 | 4.0 |
| 11 | " | (3) | " | 160 | 30 | 750 | 5-15 | 4.2 |
| 12 | " | (2) | " | 160 | 10 | 1680 | 5-45 | 3.1 |
| 13 | " | (4) | " | 140 | 15 | 101 | 1 | 5.0 |
| 14 | " | " | " | 160 | 10 | 1800 | 4 | 3.4 |
| 15 | — | " | " | 160 | 30 | 1800 | 360 | 3.1 |
| 16 | — | " | L | 160 | 30 | 1800 | 180 | 3.3 |
| 17 | (b) | " | L | 160 | 30 | 120 | 3 | 5.4 |
| 18 | " | " | AC | 140 | 15 | 145 | 1 | 5.1 |
| 19 | " | (5) | AC | 140 | 15 | 75 | 1 | 5.4 |
| 20 | (c) | (1) | TBA | 160 | 10 | — | >420 | 1.4 |
| 21 | " | (3) | " | 160 | 10 | — | >300 | 1.3 |
| 22 | " | (2) | " | 160 | 10 | >1800 | 288 | 1.8 |

TABLE I-continued

| Example No. | Components Hydrophilic Compound | Polyfunctional Reactant | Nitrogen Catalyst | Annealing Conditions Temp. (° C) | Time (Min.) | Charge Dissipation (Sec.) | Wettability (Sec.) | Wicking (Inch) |
|---|---|---|---|---|---|---|---|---|
| 23 | " | (4) | " | 160 | 10 | >1800 | 120 | 2.6 |

TBA = tribenzyl amine, AC = ε-aminocaproic acid, L = lysine, TMA = trimellitic acid, TMAA = trimellitic acid anhydride.

The hydrophilic compounds employed in Tables I–IV were as follows:
(a) 50:50 molar mixture of isomeric additives of Class A wherein $E_1$ is $-CO_2(CH_2CH_2O)_4CH_3$ and $E_2$ is $-CO_2CH_2CH(OH)CH_2OH$.
(b) blend of 50:50 molar mixtures of isomeric additives of Class A wherein $E_1$ is $-CO_2(CH_2CH_2O)_nCH_3$ and $E_2$ is $-CO_2CH_2CH(OH)CH_2OH$, in which $n$ is 6, 7 and 8, with weight average $n=7$,
(c) Class C additive wherein $n$ = zero, and $D_1$ $D_2$ are the same and are each $-NHCO(CHOH)_3CH_2OH$, with $D_2$ being in the meta position with respect to $D_1$.

The polyfunctional reactants employed in Tables I–IV were as follows:

(1)
1,2,4-C$_6$H$_3$(CO$_2$CH$_2$CH——CH$_2$)$_3$ with epoxide O

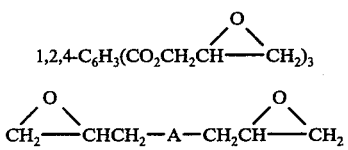

(2) A = $-OCH_2CH_2CH_2CH_2O-$ (3)
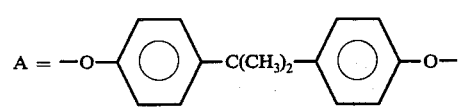
A = $-O-\langle\bigcirc\rangle-C(CH_3)_2-\langle\bigcirc\rangle-O-$

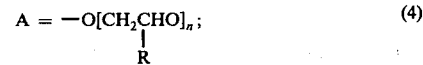
(4)
$A = -O[CH_2CHO]_n;$
          |
          R equ. weight = 175–205 (Dow Epoxy Resin DER 736)

(5) Same A as in (4); equ. weight = 305–335 (Dow Epoxy Resin DER 732)

EXAMPLES 24–32

The procedure of Examples 1–23 was repeated using woven Dacron 54 as the tested fabric. Results are summarized in Table II.

TABLE II

| Example No. | Components Hydrophilic Compound | Polyfunctional Reactant | Nitrogen Catalyst | Annealing Conditions Temp. (° C) | Time (Min.) | Charge Dissipation (Sec.) | Wettability (Sec.) | Wicking (Inch) |
|---|---|---|---|---|---|---|---|---|
| Control | — | — | — | 160 | 5 | >1800 | >360 | 3.5 |
| 24 | (a) | (1) | TBA | 160 | 5 | >1800 | 7 | 5.3 |
| 25 | " | " | " | 160 | 5 | >1800 | — | 6.5 |
| 26 | " | (2) | " | 160 | 10 | 65 | 1 | >9.0 |
| 27 | (b) | (1) | " | 160 | 10 | 570 | 150 | 4.0 |
| 28 | " | " | " | 160 | 10 | 140 | — | — |
| 29 | " | (3) | " | 160 | 15 | 140 | 1 | — |
| 30 | " | (2) | " | 160 | 10 | 210 | 2 | — |
| 31 | (c) | (1) | " | 160 | 10 | — | 360 | 6.0 |
| 32 | " | (2) | " | 160 | 10 | — | 30 | — |

TBA = tribenzylamine

EXAMPLES 33–42

Following the procedures of Examples 1–23, double knit Dacron 56 cloth samples were treated to determine the charge dissipation, wettability and wicking properties imparted to the cloth by the hydrophilic additives of the present invention. Results are set forth in Table III.

TABLE III
TREATMENT OF DOUBLE KNIT DACRON 56

| Example No. | Components Hydrophilic Compound | Polyfunctional Reactant | Nitrogen Catalyst | Annealing Conditions Temp. (° C) | Time (Min.) | Charge Dissipation (Sec.) | Wettability (Sec.) | Wicking (Inch) |
|---|---|---|---|---|---|---|---|---|
| Control | — | — | — | 160 | 5 | >1800 | >360 | 1.5 |
| 33 | (a) | (1) | TBA | 160 | 5 | >1800 | 2 | 4.5 |
| 34 | " | (2) | TBA | 160 | 10 | 270 | 1 | 6.1 |
| 35 | (b) | (1) | TBA | 160 | 10 | 600 | 2 | 6.8 |
| 36 | " | " | AC | 160 | 60 | >1800 | 1 | 7.0 |
| 37 | " | (3) | TBA | 160 | 15 | >1800 | 1 | 5.8 |
| 38 | " | " | TBA | 160 | 30 | 350 | 1 | 6.2 |
| 39 | " | (2) | TBA | 160 | 10 | — | 1 | 6.5 |
| 40 | " | (4) | AC | 160 | 30 | 85 | 1 | 7.5 |
| 41 | (c) | (1) | TBA | 160 | 10 | — | 30 | 3.0 |
| 42 | " | (2) | TBA | 160 | 10 | >1800 | 10 | 4.8 |

TBA = tribenzyl amine, AC = ε-aminocaproic acid.

EXAMPLES 43–47

The procedure of Examples 1–23 was repeated using cloth samples of double knit Dacron 56. The wettability, wicking and charge dissipation properties of the cloth samples were determined after annealing and again after subjecting the annealed samples to 10 laundry cycles. The data thereby obtained, set forth in Table IV, shows that hydrophilic additives remain in the cloth even after 10 laundry cycles.

TABLE IV

Effect of Cure Time and Washing on the Hydrophilicity of Double Knit Dacron 56

| Ex. No. | Hydrophilic Compound | polyfunc- tional Reactant | Nitrogen Catalyst | Cure Time (min) | Cure Temp. (° C.) | Before Washing Wetta- bility (sec) | Before Washing Wick- ing (inch) | Before Washing Charge Dissipation (sec) | After 10 Laundry Cycles Wetta- bility (sec) | After 10 Laundry Cycles Wick- ing (inch) | After 10 Laundry Cycles Dissi- pation (sec) |
|---|---|---|---|---|---|---|---|---|---|---|---|
| 43 | (a) | (1) | TBA | 5 | 140 | 3 | 2.5 | — | 1 | 4.5 | — |
|    |     |     |     | 15 |     | 10 | 2.5 | — | 1 | 4.5 | — |
|    |     |     |     | 30 |     | 10 | 1.5 | — | 1 | 5.5 | — |
|    |     |     |     | 60 |     | 10 | 1.0 | — | 1 | 3.5 | — |
| 44 | (b) | (1) | AC  | 5  | 160 | 1 | 6.0 | 985 | 1 | 5.5 | 435 |
|    |     |     |     | 15 |     | 1 | 6.7 | >1800 | 1 | 6.3 | 575 |
|    |     |     |     | 30 |     | 1 | 6.5 | >1800 | 1 | 6.3 | 1250 |
|    |     |     |     | 60 |     | 1 | 5.5 | >1800 | 1 | 5.8 | 250 |
| 45 | "   | (3) | TBA | 5  | 160 | 1 | 6.3 | 200 | 1 | 5.1 | >1800 |
|    |     |     |     | 15 |     | 1 | 5.8 | — | — | — | >1800 |
|    |     |     |     | 30 |     | 1 | 6.5 | — | — | — | >1800 |
| 46 | "   | (4) | AC  | 5  | 160 | 1 | 6.5 | 49 | 1 | 5.5 | 825 |
|    |     |     |     | 15 |     | 1 | 6.5 | 51 | 1 | 5.3 | 285 |
|    |     |     |     | 30 |     | 1 | 7.5 | 83 | 1 | 5.7 | 150 |
|    |     |     |     | 60 |     | 1 | 7.3 | 135 | 1 | 6.0 | 220 |
| 47 | "   | (5) | AC  | 5  | 160 | 1 | 7.1 | 19 | 2 | 7.2 | >1800 |
|    |     |     |     | 15 |     | 1 | 7.7 | 60 | 1 | 7.5 | 505 |
|    |     |     |     | 30 |     | 1 | 7.8 | 133 | 1 | 7.5 | 495 |
|    |     |     |     | 60 |     | 1 | 7.3 | 1050 | 1 | 7.2 | >1800 |

TBA = tribenzyl amine; AC = ε-aminocaproic acid

EXAMPLES 48–52

Following the procedure of Examples 1–23, double knit polyester Dacron 56 cloth samples were treated with liquid medium containing the selected hydrophilic additive, polyfunctional reactant and nitrogen catalyst. After air-drying of the treated samples, the cloths were annealed at 140° C or 160° C for various time intervals and the percent additive remaining on the cloths after 10 laundry cycles was determined. The concentration of additive on the cloth after annealing and before washing was taken to be 100%. The results are set forth in Table V, wherein the amount of additive remaining on the cloth is expressed as a function of annealing time and temperature.

TABLE V

| Ex. No. | Components Hydrophilic Compound | Components Polyfunctional Reactant | Components Nitrogen Catalyst | Annealing Temp. (° C.) | Weight Percent Initial Additive Remaining On Cloth After 10 Laundry Cycles Annealing Time (min.): 5 | 15 | 30 | 60 |
|---|---|---|---|---|---|---|---|---|
| 48 | (a) | (1) | TBA | 140 | 90 | 97 | 98 | 98 |
| 49 | (b) | (1) | AC | 160 | 77 | 88 | 89 | 91 |
| 50 | "   | (3) | TBA | 160 | 40 | 62 | 73 | — |
| 51 | "   | (4) | AC | 160 | 33 | 50 | 61 | 76 |
| 52 | "   | (5) | AC | 160 | 14 | 45 | 52 | 76 |

TBA = tribenzylamine, AC = ε-aminocaproic acid

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

We claim:

1. A process of treating a fibrous article prepared from fiber-forming thermoplastic resin, to improve hydrophilic properties, which comprises contacting the fibrous article in liquid organic or aqueous medium with at least one hydrophilic additive, at least one polyfunctional reactant and at least one nitrogen catalyst under conditions sufficient to incorporate additive, reactant and catalyst into the fibrous article; and heating the fibrous article having additive, reactant and catalyst incorporated therein for reaction of said incorporated additive with said incorporated reactant, said hydrophilic additive having (1) at least two ether linkages and at least one hydroxyl group per molecule, or having (2) at least one divalent group of the formula —NHCO— and at least one hydroxyl group per molecule, or having (3) at least two

groups and at least one additional hydroxyl group per molecule; and said polyfunctional reactant having per molecule at least two radicals selected from epoxide radicals and isocyanate radicals; wherein (I) said hydrophilic additive is selected from the group consisting of compounds having the formula

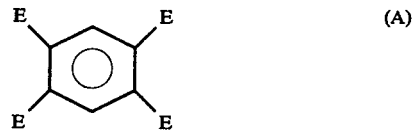

(A)

wherein two E groups are $E_1$, and two E groups are $E_2$, wherein (i) $E_1$ is —CON(R$_1$)$_2$ or —CO$_2$R$_1$, wherein R$_1$ is a monovalent radical of the formula

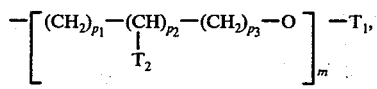

wherein $m$ is an integer of from 0 to 10; $p_1$, $p_2$ and $p_3$ are each integers of 0 or 1; $T_2$ is selected from the group consisting of hydrogen, —OH, $T_1$ and $OT_1$; and $T_1$ is in each occurrence independently selected from the group consisting of radicals of the formula

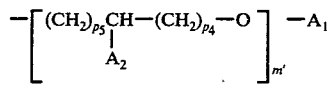

wherein $m'$ is an integer of 0 to 10, $p_4$ and $p_5$ are each integers of 0 or 1, $A_1$ is hydrogen or alkyl of 1 to 3 carbon atoms, and $A_2$ is selected from the group consisting of radicals of the formula —X and —OX, wherein X is a member of the group consisting of hydrogen and alkyl of 1 to 3 carbon atoms; and with the provisos that (1) the sum of $p_1$, $p_2$ and $p_3$ must be at least two; (2) the sum of $p_4$ and $p_5$ must be at least one; and (3) the sum of $m$ plus $m'$ must be at least two; (ii) $E_2$ is —$CO_2H$ or —$CO_2(CH_2)_{x_1}(CHOH)_{x_2}CH_2Q$, in which $x_1$ and $x_2$ are each integers of 0 or 1, and Q is hydrogen or —OH; when Q is —OH, $x_1$ must be 1; and wherein at least one E group must contain at least one —OH group;

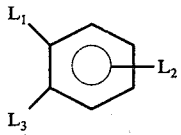
(B)

wherein $L_1$, $L_2$ and $L_3$ are independently selected from the group consisting of —$CO_2H$, —$CON(R_1)_2$, —$CO_2(CH_2)_{x_1}(CHOH)_{x_2}CH_2Q$ and —$CO_2R_1$, wherein $R_1$ is as defined above for $E_1$ of formula (A) and $x_1$, $x_2$ and Q are as defined above for $E_2$ of formula (A); with the provisos that at least one of $L_1$, $L_2$ and $L_3$ must contain at least one —OH group and at least one of $L_1$, $L_2$ and $L_3$ must be —$CO_2R_1$;

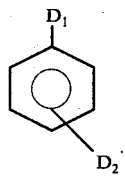
(C)

wherein $D_1$ and $D_2$ are the same or different and are independently selected from the group consisting of —$O_2CR_2$ and

wherein $R_2$ is a monovalent radical having the formula

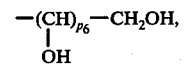

wherein $p_6$ is an integer of 2 to 4;

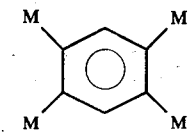
(D)

wherein two M groups are $M_1$ and two M groups are $M_2$, wherein $M_1$ and $M_2$ are monovalent radicals independently selected from the group consisting of —$O_2CR_2$ and

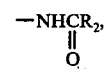

wherein $R_2$ is as defined above for formula (C); and

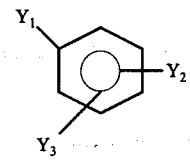
(E)

wherein $Y_1$, $Y_2$ and $Y_3$ are monovalent radicals independently selected from the group consisting of —$O_2CR_2$ and

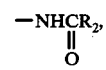

wherein $R_2$ is as defined above for formula (C); and wherein (IIa) Said polyfunctional reactant is selected from the group consisting of epoxides of formula

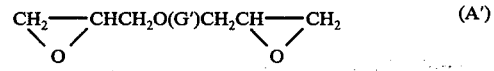
(A')

wherein (i) G' is selected from the group consisting of

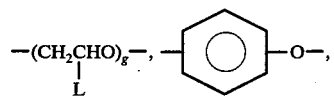

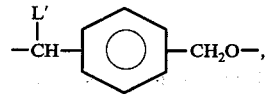

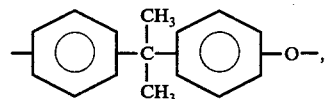

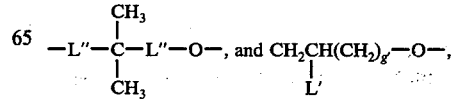

wherein g is an integer of 1 to 10, g' is an integer of 1 to 4, (ii) L is selected from the group consisting of hydrogen, alkyl radicals of 1 to 5 carbon atoms, aryl radicals, —CH$_2$OH, —CH$_2$Cl or

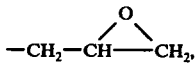

(iii) L' is selected from the group consisting of hydrogen, alkyl radicals of 1 to 5 carbon atoms, —CH$_2$CH(OH)CH$_2$OH and

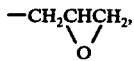

and (iv) L" is a saturated cycloalkyl radical of 5 to 6 carbon atoms;

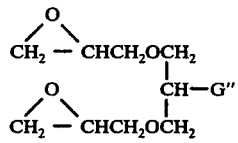 (B')

wherein G" is —OH, —OCH$_2$CH(OH)CH$_2$OH or

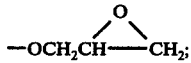

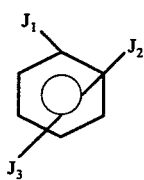 (C')

wherein J$_1$, J$_2$ and J$_3$ are independently selected from the group consisting of —CO$_2$R$_1$ and

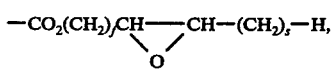

wherein f is an integer of 1 to 6 and s is an integer of 0 to 3 and R$_1$ is as defined above for E$_1$ of formula (IA); and

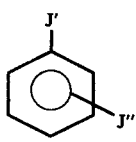 (D')

wherein J' and J" are the same or different and are monovalent radicals of the formula

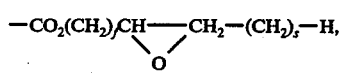

wherein f and s are as defined above for formula (C'); or
(IIb) Said polyfunctional reactant is selected from the group consisting of (A") isocyanates having the formula T$_3$(NCO)$_2$ in which T$_3$ is a diradical selected from the group consisting of (i) alkyl of 2 to 8 carbon atoms, (ii) aryl of 6 to 10 carbon atoms, (iii) alkyl-substituted aryl of 7 to 14 carbon atoms, (iv) cycloalkyl of 3 to 8 carbon atoms, (v) radicals of the formula —T$_4$'OT$_4$'— and (vi) radicals of the formula

wherein T$_4$' is divalent alkyl of 2 to 8 carbon atoms or divalent aryl, and R" is monovalent alkyl of 1 to 3 carbon atoms, and;
(B") isocyanates having the formula T$_4$(NCO)$_3$, wherein T$_4$ is a triradical selected from the group consisting of (i) alkyl of 3 to 8 carbon atoms, (ii) aryl of 6 to 10 carbon atoms, (iii) alkyl-substituted aryl of 7 to 14 carbon atoms, (iv) cycloalkyl of 3 to 8 carbon atoms, and (v) radicals of the formula

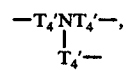

wherein T$_4$' is as defined above.

2. The process of claim 1 wherein the polyfunctional reactant is free of isocyanate radicals and wherein the nitrogen catalyst is a member selected from the group consisting of tertiary amines, amino acids, caprolactam and mixtures thereof.

3. The process of claim 1 wherein the polyfunctional reactant contains at least one isocyanate radical and wherein the nitrogen catalyst is a member selected from the group consisting of tertiary amines and mixtures thereof.

4. The process according to claim 1 wherein the liquid medium is an aqueous medium.

5. The process of claim 1 wherein the liquid medium is an organic solvent selected from the group consisting of ethers, ketones, alcohols, chlorinated hydrocarbons, and aromatic and substituted aromatic hydrocarbons.

6. The process of claim 1 wherein the hydrophilic additive is present in the liquid medium in the amount of from about 0.1 to 5% by weight.

7. The process of claim 1 wherein the liquid medium contains said hydrophilic additive and said polyfunctional reactant in a additive:reactant molar ratio of from about 2:1 to about 1:3.

8. The process of claim 1 wherein the liquid medium contains nitrogen catalysts in an amount of from about 0.1 to 5 mol percent, based on the total number of moles of hydrophilic additives and polyfunctional reactant in the liquid medium.

9. The process of claim 1 wherein the liquid medium has a temperature of from about 10° to 60° C.

10. The process of claim 1 wherein the fibrous article is contacted in liquid medium with the selected hydrophilic additive, polyfunctional reactant, and nitrogen catalyst for a time of from about 1 second to 1 hour.

11. The process of claim 1 wherein the fibrous article is contacted in liquid medium with the additive, reactant and catalyst to provide a fibrous article having hydrophilic additive incorporated therein in an amount up to about 5% by weight of the fiber.

12. The process of claim 1 wherein the liquid medium also contains a dye.

13. The process of claim 1 wherein the fibrous article having the additive, reactant, and catalyst incorporated therein is heated to a reaction temperature from about 90° to 230° C.

14. The process of claim 1 wherein the fibrous article containing incorporated additive reactant and catalyst is heated for time of from about 5 seconds to 240 minutes.

15. The process of claim 1 wherein the fiber-forming thermoplastic resin comprises a member selected from the group consisting of polyamide, polyester, polyacrylonitrile and blends thereof.

16. A fibrous article of fiber-forming thermoplastic resin having incorporated therein, to improve hydrophilic properties, at least one hydrophilic fiber additive and at least one polyfunctional reactant, each as defined in claim 1.

17. The fibrous article of claim 16 wherein the fiber-forming thermoplastic resin comprises a member selected from the group consisting of polyamide, polyester, polyacrylonitrile and blends thereof.

* * * * *